US011873122B2

(12) United States Patent
McMullen et al.

(10) Patent No.: US 11,873,122 B2
(45) Date of Patent: Jan. 16, 2024

(54) SYSTEMS AND METHODS FOR BONDING OBJECTS USING ENERGETIC WELDING

(71) Applicant: Blue Origin, LLC, Kent, WA (US)

(72) Inventors: Robert E. McMullen, Redmond, WA (US); Ryan Webb, Enumclaw, WA (US)

(73) Assignee: BLUE ORIGIN, LLC, Kent, WA (US)

( * ) Notice: Subject to any disclaimer, the term of this patent is extended or adjusted under 35 U.S.C. 154(b) by 409 days.

(21) Appl. No.: 17/190,341

(22) Filed: Mar. 2, 2021

(65) Prior Publication Data
US 2022/0281622 A1 Sep. 8, 2022

(51) Int. Cl.
B64G 1/64 (2006.01)
B64G 1/62 (2006.01)
B64G 1/00 (2006.01)

(52) U.S. Cl.
CPC .............. B64G 1/64 (2013.01); B64G 1/002 (2013.01); B64G 1/62 (2013.01)

(58) Field of Classification Search
CPC . B64G 1/64; B64G 1/002; B64G 1/62; B64G 5/00
See application file for complete search history.

(56) References Cited

U.S. PATENT DOCUMENTS

| | | |
|---|---|---|
| 2,475,597 A | 7/1949 | Dickson |
| 2,855,817 A | 10/1958 | Kope |
| 3,170,433 A | 2/1965 | Gardiner |
| 3,399,646 A | 9/1968 | Vincent |
| 3,431,880 A | 3/1969 | Pannell |
| 3,434,197 A | 3/1969 | Davenport |
| 3,577,949 A | 5/1971 | Mueller |

(Continued)

FOREIGN PATENT DOCUMENTS

| | | |
|---|---|---|
| DE | 10326430 | 1/2005 |
| WO | 2015069755 | 5/2015 |
| WO | 2016172587 | 10/2016 |

OTHER PUBLICATIONS

Bement, Laurence J., "Small-Scale Explosive Seam Welding," https://ntrs.nasa.gov/archive/nasa/casi.ntrs.nasa.gov/19740022827.pdf, Williamsburg, Virginia, May 30-Jun. 1, 1972, 35 pages.

(Continued)

Primary Examiner — Alentina Xavier
(74) Attorney, Agent, or Firm — Hogan Lovells US LLP

(57) ABSTRACT

Systems and methods for bonding objects using energetic welding are disclosed. A representative system includes a launch vehicle portion, one or more landing support elements positioned to support the launch vehicle portion when the launch vehicle portion lands on a landing surface, and a bonding device carried by at least one of the landing support elements and configured to form a bond between the bonding device and the landing surface when the launch vehicle portion is on the landing surface. The bond may include a weld. A further representative system includes a bonding device with an energetic material and an anchor element, wherein activating the energetic material deforms the anchor element onto a landing surface to form a weld between the bonding device and the landing surface. A representative method includes automatically bonding a portion of a launch vehicle to a landing surface in response to landing.

30 Claims, 6 Drawing Sheets

(56) References Cited

U.S. PATENT DOCUMENTS

| | | | |
|---|---|---|---|
| 3,854,027 | A | 12/1974 | Ettinger |
| 5,474,226 | A | 12/1995 | Joseph |
| 6,560,846 | B1 | 5/2003 | Shioya et al. |
| 7,530,485 | B1 | 5/2009 | Brasher et al. |
| 10,562,599 | B1 * | 2/2020 | Toth .................... B63B 35/44 |
| 10,737,809 | B2 | 8/2020 | Carreker |
| 2004/0069832 | A1 | 4/2004 | Banker |
| 2006/0254039 | A1 | 11/2006 | Daehn |
| 2011/0017872 | A1 | 6/2011 | Bezos et al. |
| 2018/0105287 | A1 | 4/2018 | Carreker |
| 2023/0012410 | A1 | 1/2023 | Riordan et al. |

OTHER PUBLICATIONS

Inverse—Mike Brown, "Falcon Heavy: How it Mastered Its Incredible Drone Ship Landing," https://www.inverse.com/article/54837-falcon-heavy-how-it-mastered-its-incredible-drone-ship-landing, Apr. 12, 2019, 3 pages.

Fecht, Sarah., "What Happens After You Land a Rocket on a Drone Ship," Popular Science, https://www.popsci.com/what-happens-after-you-land-rocket-on-drone-ship/, Apr. 9, 2016, 2 pages.

YouTube.com, IWT Percussive Stud Welding to 14" Test Ring, https://www.youtube.com/watch?v=IsGqO2wHE2A, May 22, 2013, 1 page.

Hosseinzadeh et al., "Experimental Study of High-Velocity Projectile Impact Welding," https://link.springer.com/article/10.1007/s40799-018-0262-1, Jun. 4, 2018, 6 pages.

SpaceXFleet.com., "Octagrabber—Booster Recovery," https://spacexfleet.com/Octagrabber, accessed Feb. 5, 2021, 5 pages.

Jacques Valverde—Thierry Pichon, "From IXV to Space Rider: CMC Thermal Protection System Evolutions," Ariane Group, HT-CMC/10th, Bordeaux, Sep. 22-26, 2019, 14 pages.

Website: Image Industries, Inc., Weld Studs, https://www.imageindustries.com/product/welding-products/product-type/weld-studs/, accessed Jun. 2021, 3 pages.

Website: Image Industries, Inc., Stud Weld Equipment, https://www.imageindustries.com/product/welding-products/product-type/stud-weld-equipment/, accessed Jun. 2021, 3 pages.

Image Industries, Inc., "Welder's Guide to ARC Stud Welding Process Discussion: Focusing on Plunge," https://imging-assets-prod.s3.amazonaws.com/DOCUMENTS/TRAINING_GUIDES/DRAWN_ARC_STUD_WELDING_FOCUSING_ON_PLUNGE.PDF, Jan. 14, 2008, 5 pages.

Image Industries Inc., "Welders Guide to ARC Stud Welding," https://imging-assets-prod.s3.amazonaws.com/DOCUMENTS/TRAINING_GUIDES/ARC_WELDER'S_GUIDE_REV_2_2003-09.PDF, Sep. 2003, 17 pages.

U.S. Appl. No. 17/369,896, filed Jul. 7, 2021, Applicant: Blue Origin, LLC., 60 pages.

* cited by examiner

SYSTEMS AND METHODS FOR BONDING OBJECTS USING ENERGETIC WELDING

TECHNICAL FIELD

The present disclosure is directed generally to systems and methods for bonding objects using energetic welding. Representative aspects of the present disclosure relate to automatically bonding a landing support element of a reusable launch vehicle booster stage to a surface upon landing the booster stage on the surface.

BACKGROUND

Rockets have been used for many years to launch human and non-human payloads into orbit. Such rockets delivered the first humans to space and to the Moon, and have launched countless satellites into the Earth's orbit and beyond. Such rockets are used to propel unmanned space probes to deliver structures, supplies, and personnel to the orbiting International Space Station.

Rocket manufacturers continually strive to reduce the cost of launching a payload into space or the upper atmosphere. One approach for reducing such costs is to retrieve one or more stages of a rocket, such as one or more booster stages used to propel the rocket. In a particular approach, a rocket stage is landed vertically (e.g., tail-down or nozzle-down) and then refurbished for launch. One drawback with this approach is that it may be difficult to land the rocket stage in an exact position, such as a position that has been configured to secure the rocket stage in a vertical orientation. In yet another particular approach, a rocket stage is landed vertically on a floating platform (such as a sea-going platform). A floating platform may rock and sway, which presents the additional challenge of keeping the rocket stage upright after landing. Additionally, a rocket stage that has landed on a surface but has not been secured, including a surface on a floating platform, presents a potential safety hazard for workers and equipment nearby. Accordingly, one challenge associated with landing a vehicle (such as a rocket stage) vertically is ensuring the vehicle is adequately supported after landing. Aspects of the present disclosure are directed to addressing this challenge.

BRIEF DESCRIPTION OF THE DRAWINGS

In the drawings, wherein the same reference number indicates the same element throughout the views.

DETAILED DESCRIPTION

Figure 1:
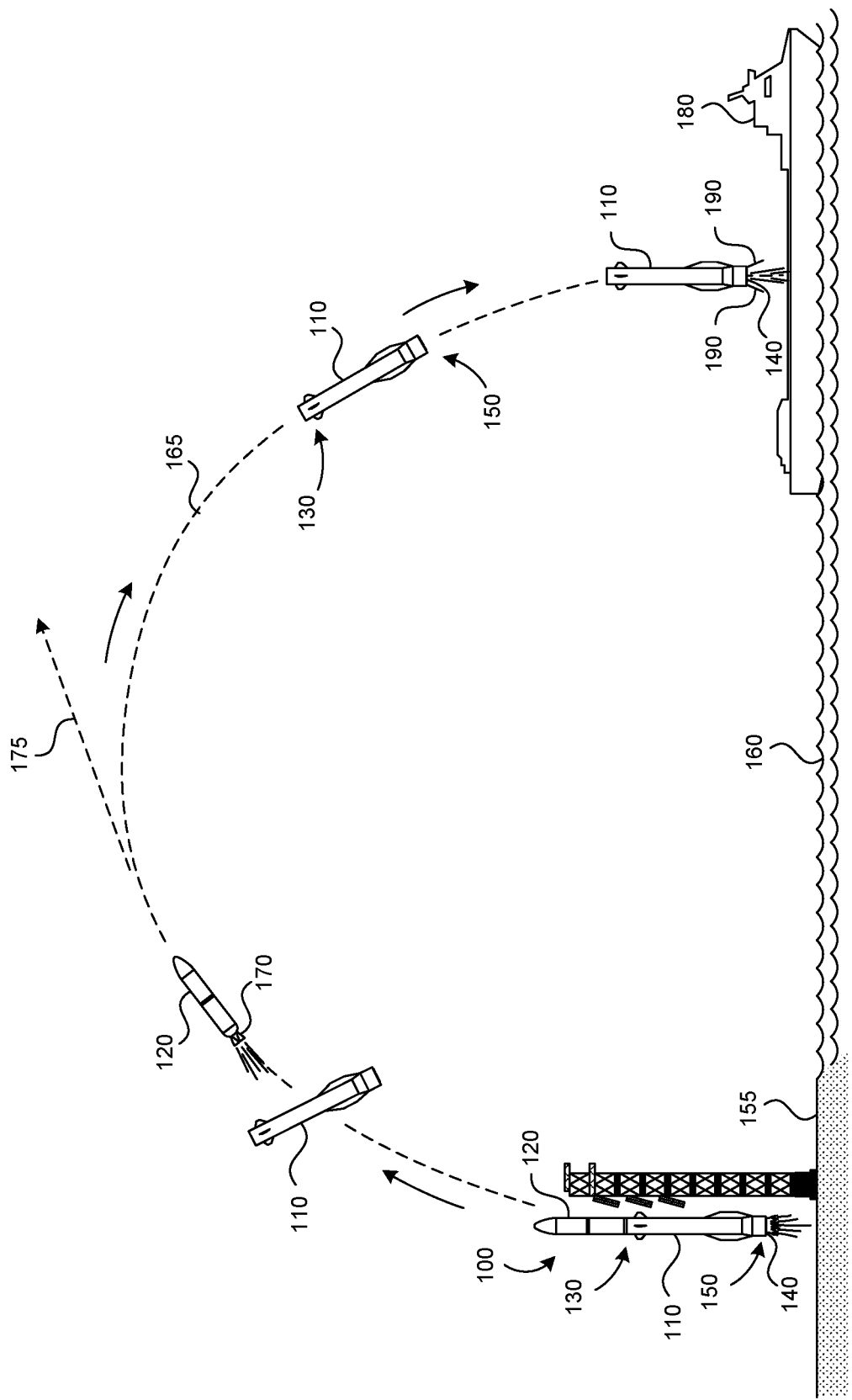
FIG. 1 is a schematic diagram illustrating a mission profile of a launch vehicle including a launch vehicle portion that lands on a surface.

Embodiments of the technology disclosed herein are directed generally to systems and methods for bonding objects using energetic welding and energetic materials. Several embodiments of the present technology are directed to securing a portion of a launch vehicle (such as a booster stage) to a landing surface, but the present technology can be implemented in other systems in which rapid bonding between two objects is desired.

A representative system includes a launch vehicle portion, one or more landing support elements carried by the launch vehicle portion and positioned to support the launch vehicle portion upon landing on a landing surface, and a bonding device carried by at least one of the landing support elements and configured to form a weld between the bonding device and the landing surface when the launch vehicle portion is on the landing surface. A further representative system includes a bonding device having an energetic material, and an anchor element having a layer of metal material, wherein activating the energetic material deforms the layer of metal material onto the landing surface to form a weld between the bonding device and the landing surface. A representative method includes automatically welding a portion of a launch vehicle to a landing surface after landing (e.g., in response to landing), using an energetic material.

Several details describing structures and processes that are well-known and often associated with energetic materials and launch vehicles are not set forth in the following description to avoid obscuring other aspects of the disclosure. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1-6.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller, or data processor that is specifically programmed, configured, or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers, and the like). Information handled by these computers can be presented at any suitable display medium, including an LCD.

The technology can also be practiced in distributed environments, where tasks or modules are performed by remote processing devices that are linked through a communications network (e.g., a wireless communication network, a wired communication network, a cellular communication network, the Internet, and/or a short-range radio network such as Bluetooth). In a distributed computing environment, program modules and/or subroutines may be located in local and remote memory storage devices. Aspects of the technology described below may be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

FIG. 1 is a schematic diagram illustrating a representative mission profile of an aerospace system including a launch vehicle, in which at least a portion of the launch vehicle lands in a controlled manner on a surface. A launch vehicle 100 can include multiple portions (e.g., stages), such as a first or booster stage 110 and one or more second or upper stages 120. The launch vehicle 100 can be a space launch vehicle for carrying humans or cargo to space or it can be a launch vehicle for moving humans or cargo within the Earth's atmosphere. Accordingly, although reference may be made to orbital space, embodiments of the present technology may be used with portions (e.g., stages) of launch vehicles that carry out suborbital missions.

Although the upper stage 120 is stacked on top of the booster stage 110 in the illustrated mission profile, in other embodiments the launch vehicle 100 and variations thereof can have other configurations without departing from the present disclosure. For example, the upper stage 120 and the booster stage 110 can be positioned side-by-side and attached to each other during ascent with a suitable separation system. In another example, two or more booster stages 110 or variations thereof can be positioned around the upper stage 120 in a "strap-on" type configuration. Accordingly, the present disclosure is not limited to the particular launch vehicle configuration illustrated in FIG. 1. Although embodiments of the present technology may be applied to any of the portions (e.g., stages) of the launch vehicle 100, such that embodiments of the present technology may secure any of the portions to a surface, a representative embodiment is described in more specific detail below with regard to the booster stage 110. The booster stage 110 includes a forward end 130 and one or more rocket engines 140 (including one or more exhaust nozzles) positioned toward an aft (tail) end 150.

In the illustrated example, the launch vehicle 100 takes off from a coastal or other land-based launch site 155 and then turns out over a body of water 160 (such as an ocean). At some point, such as after a high-altitude booster engine cutoff (BECO) operation, the booster stage 110 separates from the second (e.g., upper) stage 120 and continues along a ballistic trajectory 165. The second (e.g., upper) stage 120 can include one or more engines 170 that ignite and propel the second stage 120 into a higher trajectory 175 for orbital insertion or other destinations or activities.

The booster stage 110 reenters the Earth's atmosphere before or after reorienting so that the aft end 150 is pointing in the direction of motion (tail-first). The booster stage 110 descends toward a landing platform 180, which can be a floating (e.g., sea-going) platform, although it can alternatively be a fixed platform on land (for example, the mission can take place entirely over land, or over a combination of land and water). The booster stage 110 can land tail-first on the landing platform 180 using thrust from the one or more rocket engines 140. The booster stage 110 can carry one or more landing support elements 190, which can include suitable shock-absorbing landing gear (e.g., one or more landing legs). The landing support elements 190 can support the booster stage 110 in an upright position after landing. As described in additional detail below, in response to landing, upon landing, or after landing (such as shortly after landing), the landing support elements 190 can be bonded to the landing platform 180 in accordance with embodiments of the present disclosure.

The foregoing mission profile is provided for example only and does not limit application of the present technology. For example, embodiments of the present technology can be used to secure any portion (e.g., stage) of a launch vehicle after the portion lands in any orientation on any suitable landing support element 190, with or without thrust (e.g., with a parachute to control the rate of descent).

Figure 2:
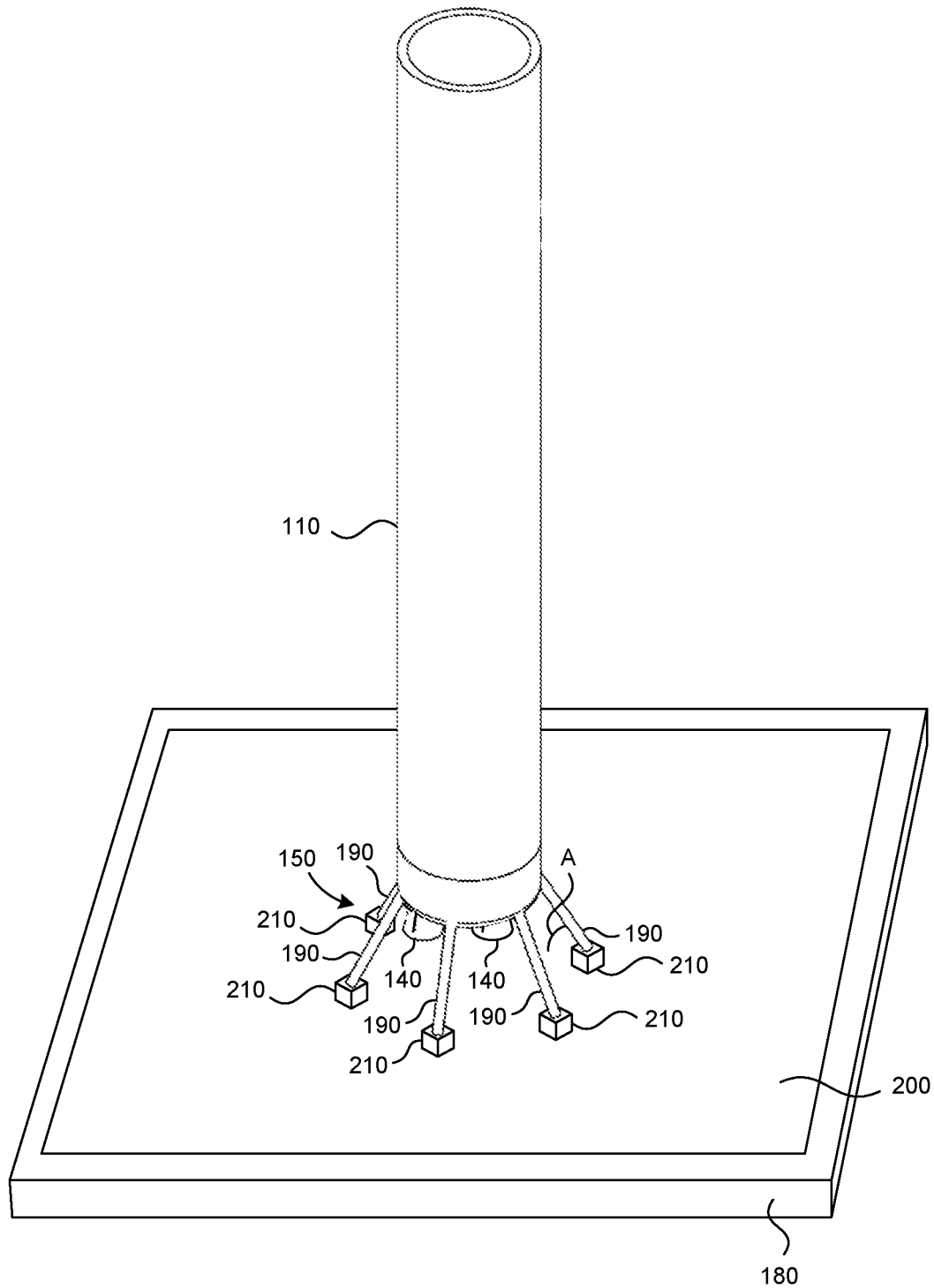
FIG. 2 illustrates a partially schematic view of a portion of a launch vehicle (e.g., a booster stage) after landing on a landing surface, which can be a landing surface on a floating landing platform or on land.

FIG. 2 illustrates a partially schematic view of a portion of a launch vehicle (e.g., the booster stage 110) after landing on a landing surface 200, which can be a landing surface 200 on the landing platform 180. The landing surface 200 can include a metal material, such as steel or another suitable metal material. For example, the landing surface 200 can include one or more plates of steel with a thickness of approximately 1.5 inches (or another suitable thickness), spanning an area positioned to receive the portion of the launch vehicle. One or more (e.g., all) of the landing support elements 190 can include a bonding device 210 positioned to contact the landing surface 200 as the launch vehicle (e.g., the booster stage 110) lands.

Upon landing, each bonding device 210 can automatically bond (e.g., weld) the booster stage 110 (via the one or more landing support elements 190) to the landing surface 200. Although five landing support elements 190 are visible in FIG. 2, and although the landing support elements 190 are illustrated as being oriented at an oblique angle A relative to the landing surface 200, embodiments of the present technology can implement more or fewer landing support elements 190 and/or the landing support elements 190 can be oriented at other angles A relative to the landing surface 200, such as an approximately 90-degree angle (e.g., the landing support element 190 can be generally vertical).

Figure 3A:
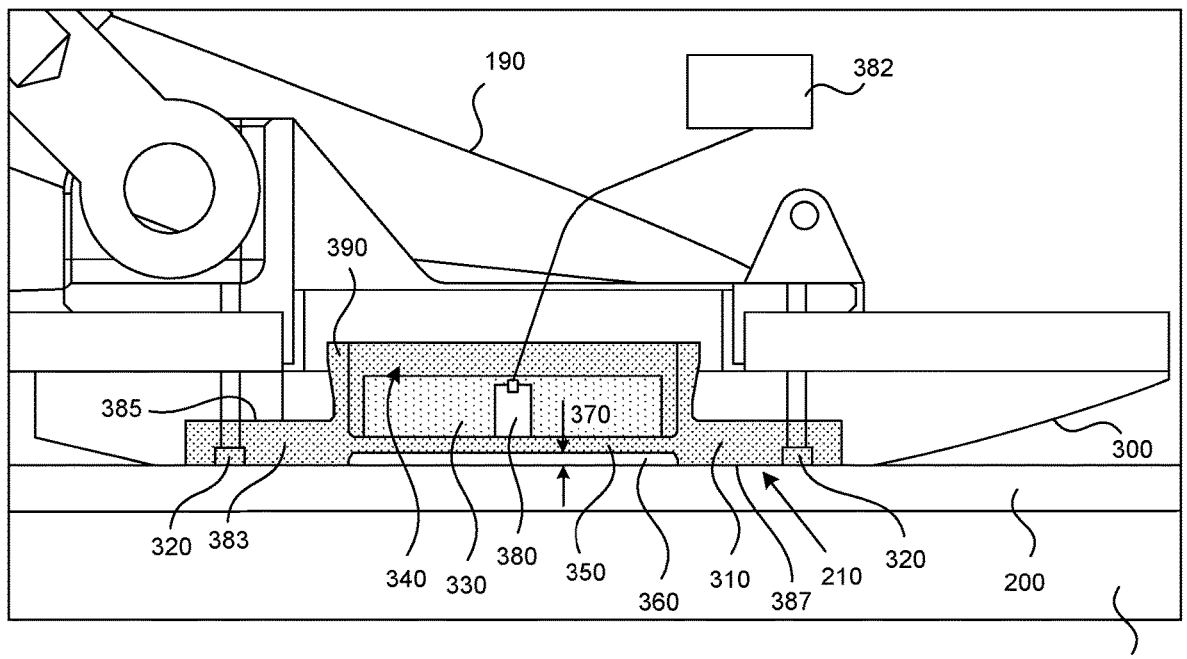
FIG. 3A illustrates a partially schematic side cross-sectional view of a bonding device carried by a landing support element and configured in accordance with embodiments of the present technology.
Figure 3B:
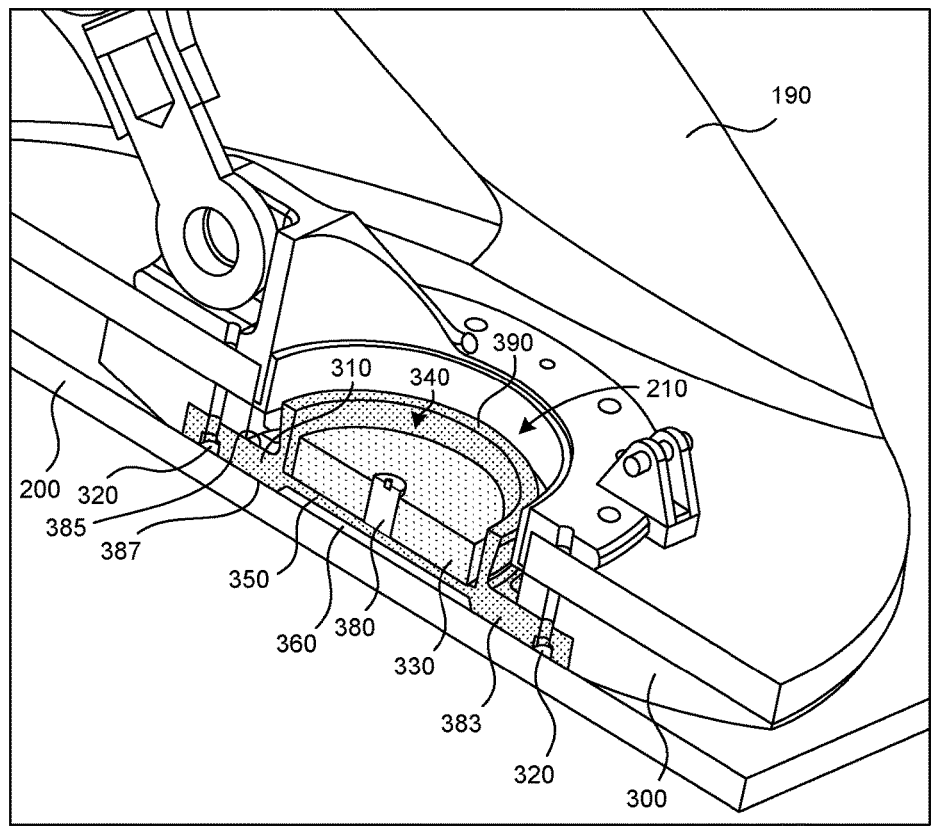
FIG. 3B illustrates a partially schematic perspective cross-sectional view of the bonding device carried by the landing support element shown in FIG. 3A.

FIG. 3A illustrates a partially schematic side cross-sectional view of a bonding device 210 carried by a landing support element 190 and configured in accordance with embodiments of the present technology. FIG. 3B illustrates a partially schematic perspective cross-sectional view of the bonding device 210 carried by the landing support element 190 shown in FIG. 3A. With reference to both FIGS. 3A and 3B, the landing support element 190 can include a foot pad 300, which may contact the landing surface 200 upon landing. The foot pad 300 can carry the bonding device 210. In some embodiments, the landing support element 190 can directly carry the bonding device 210, without a foot pad 300. The bonding device 210 can include an anchor element 310 releasably attached to the foot pad 300 (or attached directly to the landing support element 190) via one or more releasable fastening elements 320, such as bolts or other suitable releasable fasteners.

The anchor element 310 is shaped and configured to carry an energetic material 330. For example, the anchor element 310 can include an upper cavity 340 for receiving the energetic material 330. At the bottom of the upper cavity 340 is a layer 350 of metal material configured to be positioned between the energetic material 330 and the landing surface 200. The anchor element 310 can also include a lower cavity 360, which forms a gap 370 between the layer 350 of metal material and the landing surface 200. An initiation device 380 is positioned in or near the energetic material 330 and is configured to initiate or activate the energetic material 330.

In some embodiments, system(s) implementing the bonding device 210 can include a controller 382 (which is schematically illustrated in FIG. 3A) configured to receive instructions to initiate the initiation device 380 or programmed with instructions that, when executed, carry out operations associated with the bonding device 210. The launch vehicle can carry the controller 382 or the controller 382 can be separate from the launch vehicle, with suitable wireless or wired connections for communicating with the initiation device 380.

Activation of the energetic material 330 produces pressure against the layer 350 of metal material, which causes the layer 350 to deform onto the landing surface 200 (i.e., the layer 350 impacts the landing surface 200), causing the gap 370 to generally close. The impact of the layer 350 onto the landing surface 200 causes the layer 350 of metal material to bond (e.g., weld) to the landing surface 200. When the layer 350 of metal material is bonded to the landing surface 200, the bonding device 210 is bonded to the landing surface 200, and accordingly, the landing support element 190 is bonded to the landing surface 200. Bonding the landing support element 190 to the landing surface 200 enhances stability of the landed rocket, especially on a floating platform and/or in windy conditions. Operators can release the releasable fastening elements 320 to free the landing support element 190 and/or the foot pad 300 from the bonding device 210 to free the landing support element 190 from the landing surface 200.

The anchor element 310 can be formed with multiple pieces, or it can be formed as an integral element. The anchor element 310 can include a plate portion 383 having a first or upper side 385 facing the landing support element 190, and a second or lower side 387 opposite the upper side 385 and positioned to face the landing surface 200. The anchor element 310 can further include a perimeter or ring portion 390 positioned on the upper side 385 of the plate portion 383. The ring portion 390 can form the upper cavity 340 for receiving the energetic material 330. The plate portion 383 can include the layer 350 of metal material positioned beneath the upper cavity 340. The lower side 387 of the plate portion 383 can include or bound the lower cavity 360, which extends into the plate portion 383 and forms the gap 370 between the layer 350 of metal material and the landing surface 200. In some embodiments, the lower side 387 can extend beyond the foot pad 300 (e.g., below the lowest portion of the foot pad 300) such that the lower side 387 contacts the landing surface 200 and the foot pad 300 does not contact the landing surface 200. In other embodiments, the lower side 387 can be generally flush with the outwardly positioned surfaces of the foot pad 300 such that the lower side 387 and the foot pad 300 contact the landing surface 200 upon landing.

In some embodiments, energy from activation of the energetic material 330 can be directed upward in addition to downward toward the layer 350. Accordingly, in some embodiments, the landing support element 190 can be generally open above the energetic material 330.

In some embodiments, the anchor element 310 can have an overall width or diameter of approximately 14 inches. In some embodiments, the gap 370 can span a distance of approximately one-fourth of an inch between the bottom of the layer 350 of metal material and the landing surface 200 (in other words, the gap 370 can extend into the anchor element 310 by a distance of approximately one-fourth of an inch). Although specific dimensions are provided for context and/or to indicate representative embodiments, various further embodiments can have other sizes.

In some embodiments, the layer 350 of metal material can be formed with a high elongation steel material such as SAE 304 stainless steel. In some embodiments, other components of the anchor element 310 can be formed with the same material as, or a different material from, the layer 350 of metal material. Although representative embodiments include the layer 350 being formed with SAE 304 stainless steel because of its generally high elongation properties that facilitate a strong bond (e.g., a weld) and because of its general resistance to corrosion, other embodiments can include other materials suitable for bonding together under the pressure from an energetic material. For example, although soft metals are preferable, various embodiments can include any metal materials that can be rapidly pressed together to form a bond (e.g., a weld). In some embodiments, the landing surface 200 can also be formed with SAE 304 stainless steel. In further embodiments, the landing surface 200 can be formed with A36 steel and it can be ground (e.g., polished) to improve the bond.

The energetic material 330 can include an ammonium nitrite and fuel oil (ANFO) material, but further embodiments can include other suitable energetic materials. The initiation device can include a booster (such as PETN, RDX, HMX, or another suitable material) and a device or material for activating the booster, and/or another initiation device suitable for activating the energetic material 330.

Figure 4A:
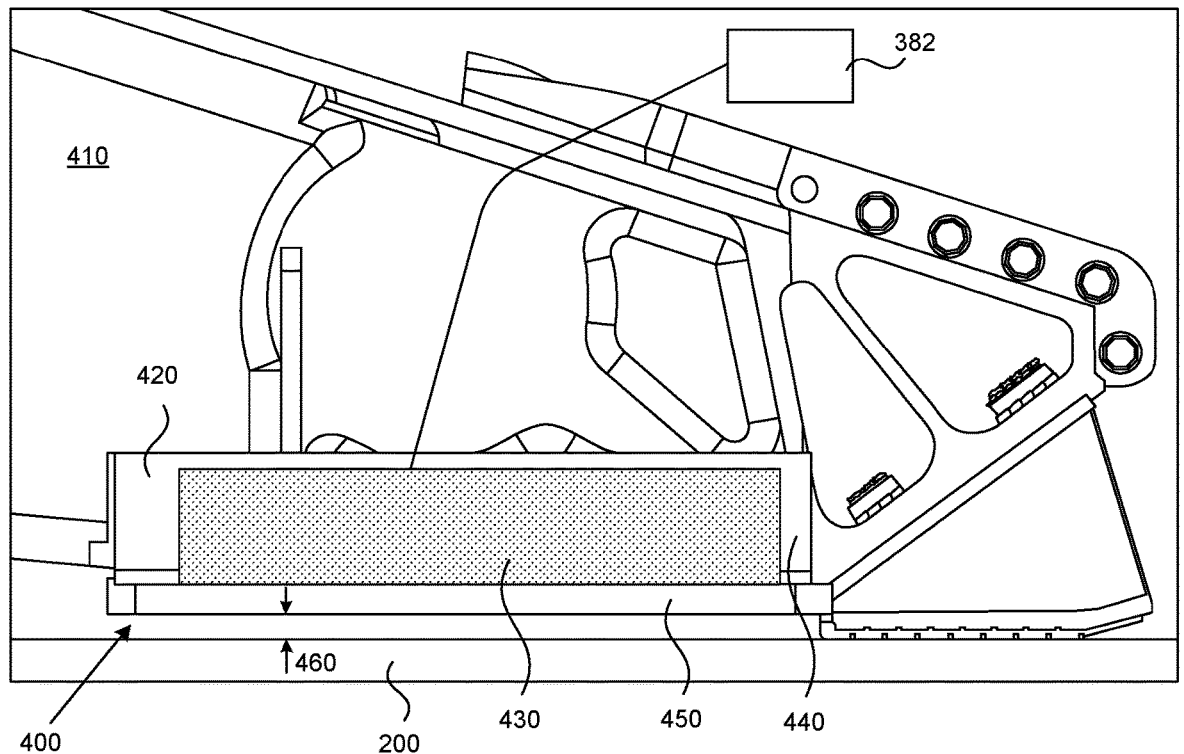
FIG. 4A illustrates a partially schematic side view of a bonding device carried by a landing support element and configured in accordance with further embodiments of the present technology.
Figure 4B:
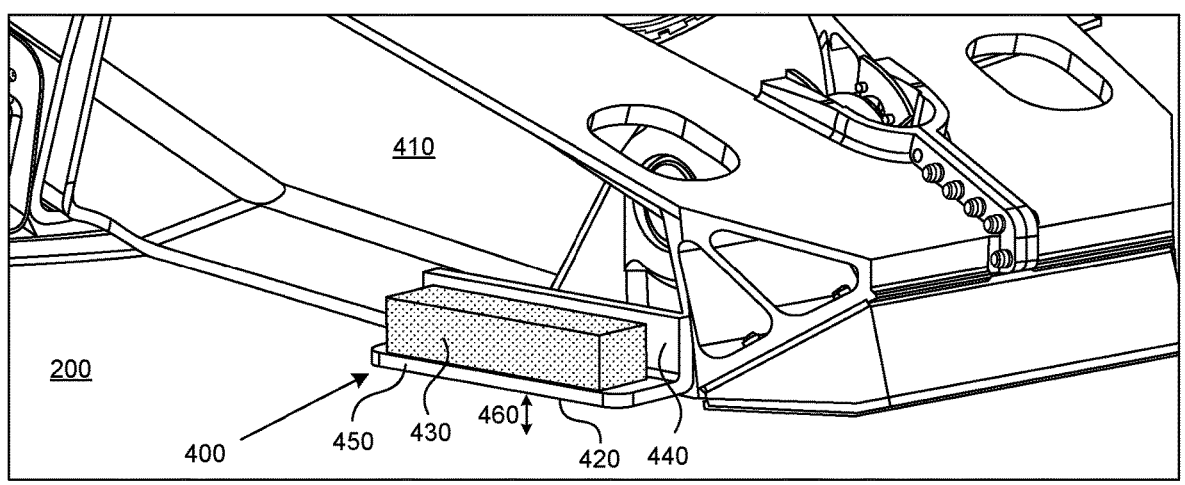
FIG. 4B illustrates a partially schematic perspective view of the bonding device carried by the landing support element shown in FIG. 4A.

FIG. 4A illustrates a partially schematic side view of a bonding device 400 carried by a landing support element 410 and configured in accordance with further embodiments of the present technology. FIG. 4B illustrates a partially schematic perspective view of the bonding device 400 carried by the landing support element 410 shown in FIG. 4A. With reference to FIGS. 4A and 4B, the bonding device 400 can be attached to a side or edge of the landing support element 410. In some embodiments, a plurality (such as two) bonding devices 400 can be positioned on various (e.g., opposing) sides of the landing support element 410.

The bonding device 400 can include an anchor element 420 configured to support an energetic material 430. In some embodiments, the anchor element 420 can be generally L-shaped, having an upright portion 440 attached to the landing support element 410 and a horizontal portion 450 extending from the upright portion 440. The horizontal portion 450 can include and/or can be formed with a layer of metal material, which can be similar to the layer 350 of metal material described above with regard to FIGS. 3A and 3B. The energetic material 430 can be linearly (such as rectangularly) shaped, or it can have other forms.

The anchor element 420 can be positioned on the landing support element 410 such that the horizontal portion 450 is spaced apart from the landing surface 200 upon landing, forming a gap 460 between the horizontal portion 450 and the landing surface 200. Activation of the energetic material 430 produces pressure that deforms the horizontal portion 450 downward, such that the horizontal portion 450 impacts the landing surface 200 and bonds (e.g., welds) to the landing surface 200. Operators can release the anchor element 420 from the remainder of the landing support element 410 (for example, by releasing fasteners or cutting the anchor element 420) to free the portion of the launch vehicle (e.g., the booster stage) from the landing surface 200. In some embodiments, energy from activation of the linearly-shaped energetic material 430 can be directed upward or outward, although in either situation, the energy is directed away from the landing support element 410.

In some embodiments, system(s) implementing the bonding device 400 can include the controller 382 (which is schematically illustrated in FIG. 4A) configured to receive instructions to activate the energetic material 430 (for example, with an initiation device) or programmed with instructions that, when executed, carry out operations associated with the bonding device 400.

Figure 5:
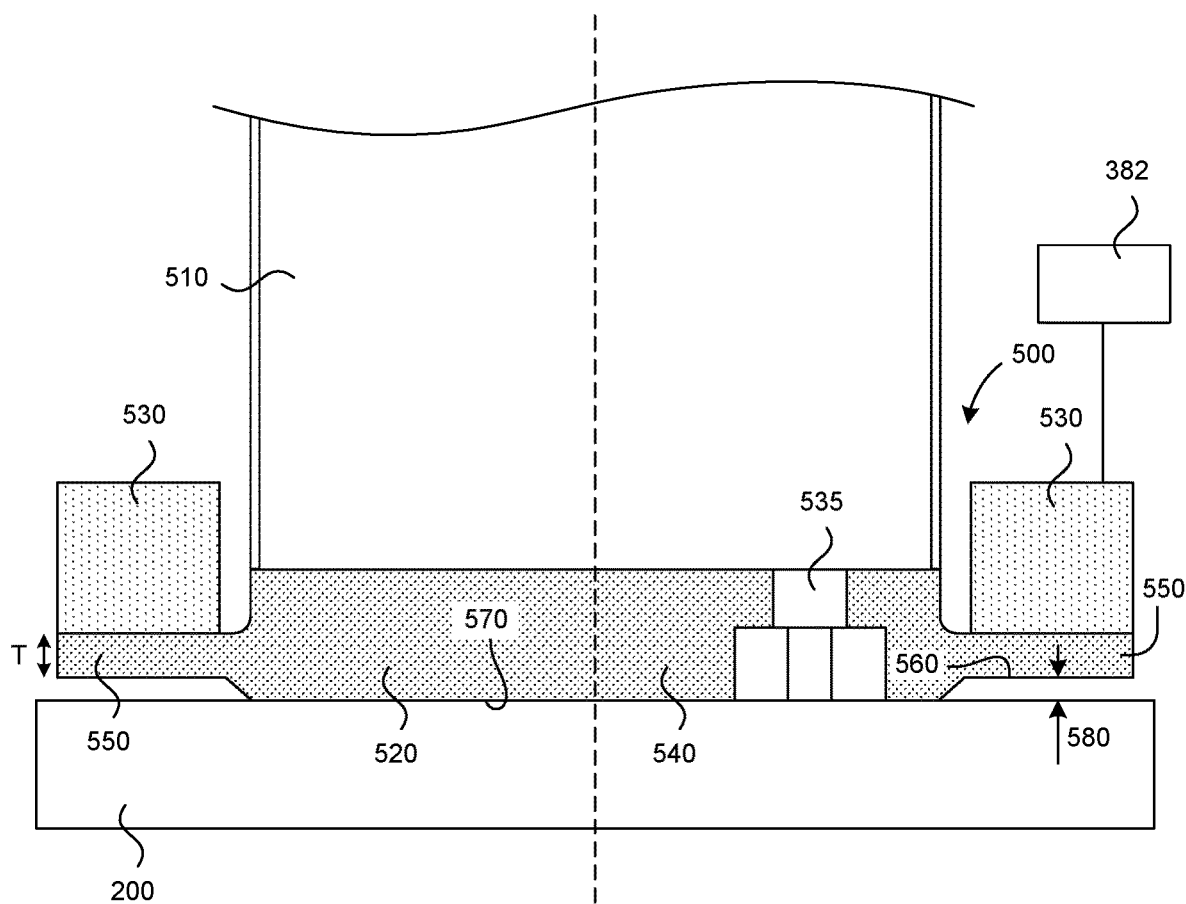
FIG. 5 illustrates a partially schematic side cross-sectional view of a bonding device carried by a landing support element and configured in accordance with further embodiments of the present technology.

FIG. 5 illustrates a partially schematic side cross-sectional view of a bonding device 500 carried by a landing support element 510 and configured in accordance with further embodiments of the present technology. The bonding device 500 includes an anchor element 520 and an energetic material 530 supported on the anchor element 520. The anchor element 520 is attached to a bottom portion of the landing support element 510 (e.g., with one or more fasteners 535) such that the anchor element 520 can be between the landing support element 510 and the landing surface 200 upon landing. In some embodiments, the anchor element 520 includes a plate portion 540 and a ring portion 550 extending from the plate portion 540. The plate portion 540 and the ring portion 550 can be arcuate in shape (such as circular) or they can have a polygonal shape or another suitable shape. In a particular representative embodiment, the ring portion 550 is an annular ring extending from the plate portion 540. The ring portion 550 includes a bottom surface 560 that is recessed away from a lowermost surface 570 of the plate portion 540 to form a gap 580 between the ring portion 550 and the landing surface 200. The ring portion 550 can include and/or can be formed with a layer of metal material, which can be similar to the layer 350 of metal material described above with regard to FIGS. 3A and 3B.

In some embodiments, the ring portion 550 can have a thickness T of approximately 0.5 inches and the gap 580 can span a distance of approximately one-fourth of an inch between the bottom surface 560 of the ring portion 550 and the landing surface 200 (or the lowermost surface 570 of the plate portion 540). Although specific dimensions are provided for context and/or to indicate representative embodiments, various further embodiments can have other sizes.

Upon activation of the energetic material 530, pressure deforms the ring portion 550 downward to cause the ring portion 550 to impact the landing surface 200, which causes the ring portion 550 to bond (e.g., weld) to the landing surface 200. Accordingly, activation of the energetic material 530 bonds the anchor element 520 to the landing surface 200. In some embodiments, the energetic material 530 can be activated in one location, causing two activation fronts to travel around the ring portion 550. In some embodiments, the energetic material 530 can be activated in multiple locations.

Operators can release the anchor element 520 from the remainder of the landing support element 510 (for example, by releasing the fasteners 535 or cutting the anchor element 520) to free the launch vehicle from the landing surface 200. In some embodiments, energy from activation of the energetic material 530 can be directed upward or outward, although in either situation, the energy is directed away from (or at least not directed towards) the landing support element 510.

In some embodiments, system(s) implementing the bonding device 500 can include the controller 382 (which is schematically illustrated in FIG. 5) configured to receive instructions to activate the energetic material 530 (for example, with an initiation device) or programmed with instructions that, when executed, carry out operations associated with the bonding device 500.

Although representative embodiments of the present disclosure include the foregoing shapes and configurations of bonding devices, other embodiments include other shapes and configurations suitable for deforming a layer of metal onto the landing surface 200 while facilitating removal of the launch vehicle from the bonding device and while allowing energy from the activation of the energetic material to be directed away from the landing support elements and/or the remainder of the launch vehicle. Gaps between the metal material of the bonding devices and the landing surface (such as the gaps 370, 460, 580 described above) facilitate momentum and acceleration of the metal material toward the landing surface to impact the landing surface in response to activation of the energetic material, which further facilitates a strong bond between the metal material and the landing surface. In some embodiments, the gaps may be at least partially filled (e.g., fully filled) with a medium between the metal material and the landing surface. For example, such a medium may include a collapsible material such as foam. Such a medium may be configured to crush, burn, melt, evaporate, or otherwise be obliterated upon activation of the bonding devices.

Figure 6:
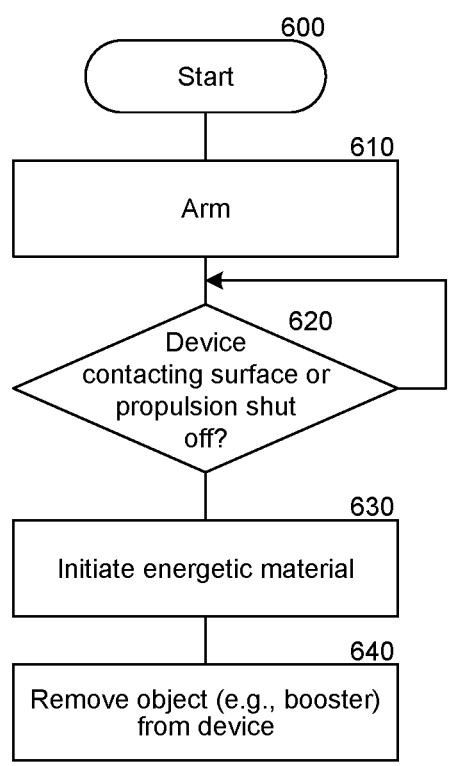
FIG. 6 is a flow chart illustrating a method of automatically bonding and subsequently removing a portion of a launch vehicle from a landing surface, in accordance with embodiments of the present technology.

FIG. 6 is a flow chart illustrating a method for automatically bonding and subsequently removing a portion of a launch vehicle from a landing surface, in accordance with embodiments of the present technology. The controller 382 (see FIGS. 3A, 4A, and 5) can carry out some or all steps of the method, or another controller or system can carry out the method. Beginning in block 600, the launch vehicle (or portion thereof, such as a booster stage) is in a pre-flight condition, or is in forward flight, or is in a tail-down orientation ready for landing. In block 610, the bonding device 610 is armed. In block 620, the controller 382 (which may be carried by the launch vehicle or separate from the launch vehicle) determines if the portion of the launch vehicle has made contact with the landing surface (e.g., touched down), and/or whether the propulsion systems have been shut off. In response to touchdown and/or shutoff of the propulsion systems, the controller 382 can initiate function of the bonding device (e.g., activation of the energetic material), in block 630. In some embodiments, the controller 382 can delay fora period of time after touchdown and/or propulsion shutoff before activating the energetic material. Activating the energetic material causes the bonding device to bond to the landing surface, as described above.

In block 640, crew can remove the portion of the launch vehicle from the bonding device, which can remain bonded to the landing surface until it is later removed and/or the landing surface is replaced. In some embodiments, removal of the portion of the launch vehicle from the bonding device can include cutting the bonding device or otherwise separating the portion of the launch vehicle from the layer of metal material that has welded to the landing surface. In some embodiments, removal of the portion of the launch vehicle can include safing procedures such as removal of propellants. In some embodiments, alternative and/or supplemental restraints can be positioned to hold the portion of the launch vehicle in place before and/or after the landing support elements are released from the bonding devices. For example, in some embodiments, releasable restraints can relieve the strain on the landing support elements and support the portion of the launch vehicle on the sea-going platform after the bonding devices have been released and the platform travels to port. The portion of the launch vehicle can be supported in an upright orientation.

One feature of several of the embodiments described above with regard to FIGS. 1-6, and with other embodiments configured according to the present disclosure, is that the bonding devices can bond anywhere on the landing surface, which is useful when it is difficult or not possible to precisely position the landing portion of the launch vehicle. Another feature is that bonding can occur quickly (in some embodiments, on the order of a millisecond), which is useful in high winds and/or rough seas, and which is in contrast to slower methods of restraining something on a surface, such as fusion welding or using fasteners. Another feature is that each bonding device can provide a strong bond, such as more than 300,000 pound-force of strength, or other suitable levels. Having multiple bonding devices on a landing portion of a launch vehicle provides redundancy. For example, in the event one or more bonding devices fail, the portion of the launch vehicle may remain attached to the landing surface. Another feature is that energy from the energetic material can be directed away from other parts of the launch vehicle (including other parts of the landing support elements). In some embodiments, it may be preferable to have a clean landing surface, such as a surface without paint or corrosion, however, it is contemplated that embodiments of the present technology can create a bond even on an imperfect metal surface. Generally, embodiments of the present technology provide a rapid system and method for securing a rocket stage to a landing surface without the need for human intervention during the bonding process. This in turn provides operators with an increased level of safety. For example, operators may be safely positioned in a remote location.

From the foregoing, it will be appreciated that specific embodiments of the disclosed technology have been described herein for purposes of illustration, but that various modifications may be made without deviating from the technology. For example, the anchor element may have different shapes for accommodating different landing elements or energetic materials. In some embodiments, bonding devices can include a cover element positioned over the energetic material to protect the energetic material from environmental factors. Although landing elements and rocket components are described herein, bonding devices configured in accordance with embodiments of the present technology can be used to bond other objects together. Although specific dimensions are provided for context and/or to indicate representative embodiments, various further embodiments can have other sizes.

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms. As used herein, the terms "generally" and "approximately" refer to values or characteristics within a range of ±10% from the stated value or characteristic, unless otherwise indicated.

We claim:

1. An aerospace system comprising:
   a launch vehicle portion;
   one or more landing support elements carried by the launch vehicle portion and positioned to support the launch vehicle portion when the launch vehicle portion lands on a landing surface; and
   a bonding device carried by at least one of the landing support elements and configured to form a weld between the bonding device and the landing surface when the launch vehicle portion is on the landing surface.

2. The aerospace system of claim 1, wherein the bonding device comprises:
   a layer of metal material; and
   an energetic material positioned to deform the layer of metal material onto the landing surface to weld the layer of metal material to the landing surface.

3. The aerospace system of claim 1, wherein the bonding device comprises an anchor element and an energetic material carried by the anchor element, wherein activation of the energetic material welds the anchor element to the landing surface.

4. The aerospace system of claim 3, wherein the anchor element comprises:
   a plate portion having a first side positioned to face the landing support element and a second side opposite the first side and positioned to face the landing surface;
   a ring portion positioned on the first side of the plate portion and forming a first cavity; and
   a second cavity extending into the second side of the plate portion;
   wherein the plate portion includes a layer of metal material positioned between the first cavity and the second cavity, the second cavity is positioned to form a gap between the landing surface and the layer of metal material when the launch vehicle portion is on the landing surface, and the energetic material is positioned in the first cavity.

5. The aerospace system of claim 4, wherein the layer of metal material is configured to deform in response to activation of the energetic material, and wherein activating the energetic material causes the layer of metal material to weld to the landing surface.

6. The aerospace system of claim 4, further comprising a foam material positioned in the gap.

7. The aerospace system of claim 3, wherein the anchor element is releasably attached to the landing support element.

8. The aerospace system of claim 7, wherein the anchor element is releasably attached to the landing support element via one or more releasable fasteners.

9. The aerospace system of claim 1, further comprising the landing surface, wherein the landing surface comprises steel.

10. The aerospace system of claim 9, further comprising a floating platform carrying the landing surface.

11. The aerospace system of claim 1, wherein:
    the launch vehicle portion is a booster stage of a launch vehicle comprising one or more upper stages;
    the booster stage comprises one or more rocket engine exhaust nozzles positioned toward an aft end of the booster stage, and the one or more landing support elements are positioned toward the aft end of the booster stage.

12. The aerospace system of claim 1, further comprising a controller programmed with instructions that, when executed:
   determine at least one of (a) whether the launch vehicle portion has touched down or (b) whether a propulsion system of the launch vehicle portion has been shut off; and
   in response to the determination, activating an energetic material to weld the bonding device to the landing surface.

13. An aerospace system comprising a bonding device configured to form a weld between the bonding device and a landing surface, wherein the bonding device comprises:
   an anchor element comprising a layer of metal material; and
   an energetic material carried by the anchor element and positioned to deform the layer of metal material in response to activation of the energetic material, wherein activating the energetic material deforms the layer of metal material to form the weld.

14. The aerospace system of claim 13, further comprising a landing support element positioned to support a portion of a launch vehicle on the landing surface, wherein the anchor element is carried by the landing support element.

15. The aerospace system of claim 14, further comprising the portion of the launch vehicle.

16. The aerospace system of claim 13, further comprising the landing surface.

17. The aerospace system of claim 13, wherein the anchor element comprises:
   a plate portion including the layer of metal material; and
   a cavity extending into the plate portion and positioned to form a gap between the layer of metal material and the landing surface when the bonding device is positioned on the landing surface.

18. The aerospace system of claim 17, further comprising a foam material positioned in the gap.

19. A method of operating an aerospace system, the method comprising:
   landing a portion of a launch vehicle on a landing surface; and
   after landing, securing the portion of the launch vehicle to the landing surface via a weld using a bonding device carried by the portion of the launch vehicle.

20. The method of claim 19, wherein securing the portion of the launch vehicle to the landing surface comprises securing a landing support element to the landing surface, wherein the landing support element is carried by the portion of the launch vehicle and the landing support element carries the bonding device.

21. The method of claim 19, wherein securing the portion of the launch vehicle to the landing surface comprises determining if the portion of the launch vehicle has made contact with the landing surface or whether a propulsion system of the portion of the launch vehicle has been shut off, and wherein using the bonding device comprises using the bonding device in response to the determination.

22. The method of claim 19, further comprising removing the portion of the launch vehicle from the surface by separating the portion of the launch vehicle from at least part of the bonding device.

23. The method of claim 22, further comprising supporting the portion of the launch vehicle in an upright orientation using one or more releasable restraints.

24. The method of claim 19, wherein securing the portion of the launch vehicle to the landing surface comprises activating an energetic material and deforming a layer of metal material onto the landing surface to weld the layer of metal material to the landing surface.

25. The method of claim 24, further comprising removing the portion of the launch vehicle from the surface by separating the portion of the launch vehicle from the layer of metal material.

26. The method of claim 24, wherein securing the portion of the launch vehicle to the landing surface comprises determining if the portion of the launch vehicle has made contact with the landing surface or whether a propulsion system of the portion of the launch vehicle has been shut off, and wherein activating the energetic material comprises activating the energetic material in response to the determination.

27. An aerospace system comprising:
   a portion of a launch vehicle;
   one or more landing support elements carried by the portion of the launch vehicle and positioned to support the portion of the launch vehicle when the portion of the launch vehicle lands on a landing surface;
   a bonding device carried by at least one of the landing support elements and configured to form a weld between the bonding device and the landing surface when the portion of the launch vehicle is on the landing surface, wherein the bonding device includes an anchor element and an energetic material; and
   a controller programmed with instructions that, when executed, determine at least one of (a) whether the launch vehicle portion has touched down or (b) whether a propulsion system of the launch vehicle portion has been shut off, and in response to the determination, activating the energetic material;
   wherein upon activation of the energetic material, the energetic material is positioned to deform at least a portion of the anchor element toward the landing surface to form the weld.

28. The aerospace system of claim 27, wherein at least a portion of the anchor element is releasably attached to the at least one of the landing support elements.

29. The aerospace system of claim 27, wherein the anchor element supports the energetic material, and wherein the anchor element comprises a layer of metal positioned to deform onto the landing surface in response to activation of the energetic material, to form the weld.

30. The aerospace system of claim 27, further comprising a platform carrying the landing surface, wherein the platform is configured to float on a body of water.

* * * * *